United States Patent [19]
Marshall

[11] Patent Number: 5,769,029
[45] Date of Patent: Jun. 23, 1998

[54] ANIMAL BATHING AND DRYING SYSTEM

[76] Inventor: William J. Marshall, P.O. Box 6425, Akron, Ohio 44312

[21] Appl. No.: 743,024

[22] Filed: Nov. 4, 1996

[51] Int. Cl.$^6$ .................................................. A01K 13/00
[52] U.S. Cl. .............................................................. 119/651
[58] Field of Search .................................... 119/606, 650, 119/651, 603, 675

[56] References Cited

U.S. PATENT DOCUMENTS

| | | | |
|---|---|---|---|
| 3,884,191 | 5/1975 | Stout | 119/158 |
| 4,382,424 | 5/1983 | Altissimo . | |
| 4,407,234 | 10/1983 | Kleman | 119/158 |
| 4,505,229 | 3/1985 | Altissimo . | |
| 4,549,502 | 10/1985 | Namdari . | |
| 4,577,624 | 3/1986 | Patton . | |
| 4,730,576 | 3/1988 | Yoshikawa . | |
| 4,836,144 | 6/1989 | Cole | 119/158 |
| 5,193,487 | 3/1993 | Vogel . | |
| 5,213,064 | 5/1993 | Mondine et al. . | |
| 5,266,190 | 11/1993 | Tominaga . | |
| 5,435,269 | 7/1995 | Chen | 119/158 |
| 5,448,966 | 9/1995 | McKinnon et al. | 119/158 |

*Primary Examiner*—Thomas Price
*Attorney, Agent, or Firm*—Oldham & Oldham Co., L.P.A.

[57] ABSTRACT

An animal bathing and drying system includes a recirculating bathing system which comprises a water input conduit having a first manually operated valve therein, a drainage output conduit having a second manually operated valve therein, a pump to bring the water input conduit and the drainage conduit, and a recirculation loop which includes a recirculating water supply conduit for supplying recirculated water from the system through a nozzle to a bathtub for bathing an animal, and a return conduit for returning water from the bathtub back to the system. The nozzle is preferably hand held and is surrounded by air. This enables a user to direct an aqueous stream through the nozzle and at an animal which is in the bathtub. Preferably, the water input conduit, the pump and the drainage output conduit and parts of the recirculated water supply conduit and the water return conduit are housed in a portable housing. Flexible hoses may be used for the portions of the recirculating water supply conduit and the water return conduit which are external to the housing. A recirculating water conduit connecting the pump outlet with the pump inlet and having a pressure release valve therein is provided to prevent pump burnout. To bathe an animal, an animal is placed in the bathtub, the tub is filled with fresh water either before or after the animal is placed in the tub, the animal is then washed with recirculated water containing added cleaning agent while no fresh water is admitted nor any water discarded, and is then rinsed with a mixture of fresh and recirculated water while fresh water is admitted to the system and simultaneously waste or used water is discarded. The animal is dried after rinse.

30 Claims, 2 Drawing Sheets

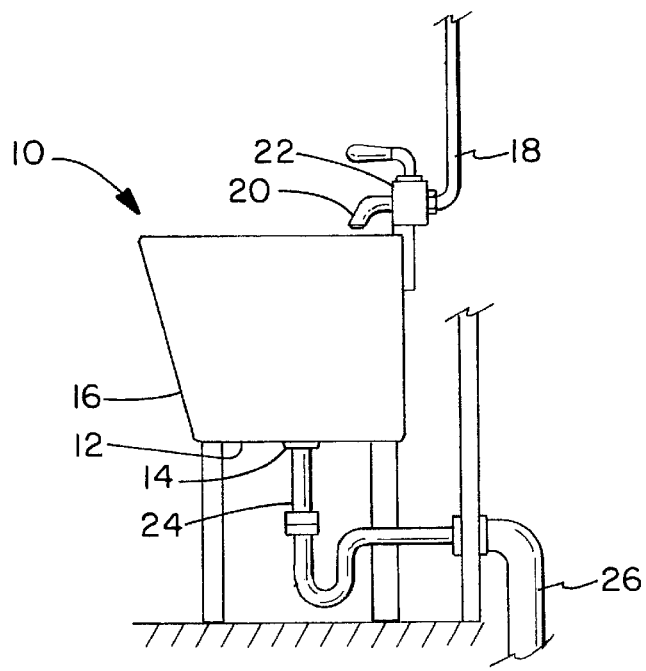
FIG.-1 PRIOR ART
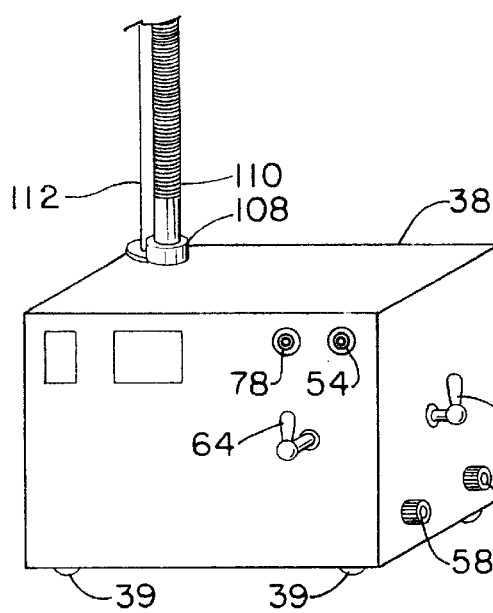
FIG.-3
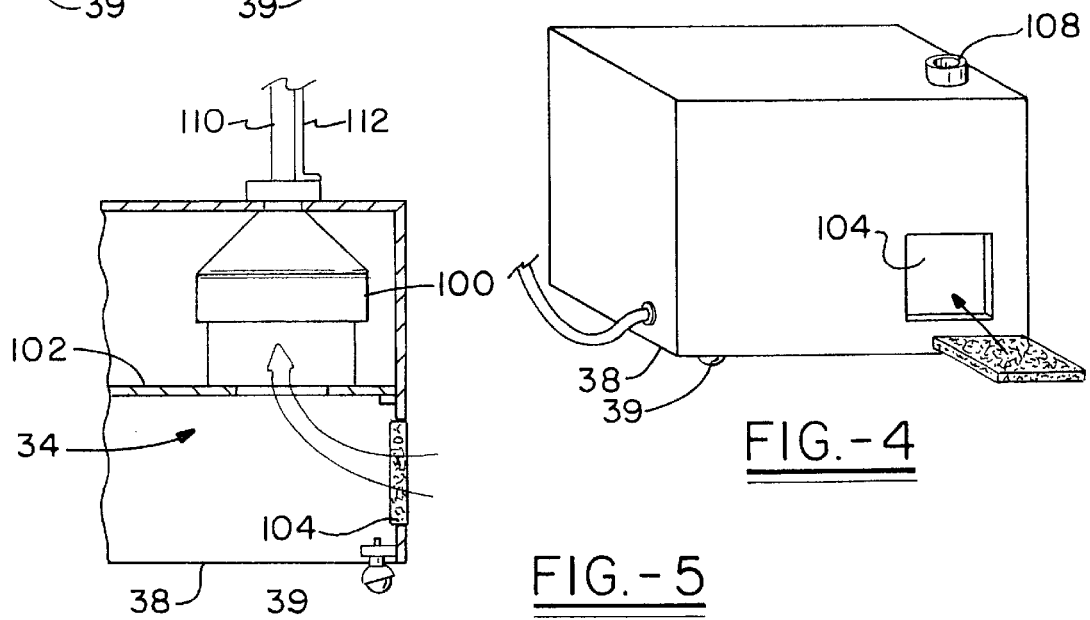
FIG.-5
FIG.-4

ANIMAL BATHING AND DRYING SYSTEM

TECHNICAL FIELD

This invention relates to animal bathing and drying systems, especially an animal bathing and drying system for small animals such as dogs and cats.

BACKGROUND OF THE INVENTION

Animals both large and small are conventionally washed by hand. This requires manual application of water and of cleaning and conditioning agents. Hand washing is a highly labor intensive operation. It is difficult to work the cleaning and conditioning agents into the animal's skin. Hand massaging is necessary for the purpose of cleaning and working cleaning agents (such as detergents and conditioning agents) into the coat and skin and for releasing loose coat. Frequently water is available only at low pressures. The result is that hand washing is slow, laborious, and does not produce uniform results, since neither thorough washing nor thorough rinsing can be assured.

Various apparatus for washing of animals are also known. These operators obviate to varying degrees the necessity for manual labor in washing an animal. Although some animal bathing apparatus known in the art provide for water circulation, the presently known animal bathing systems use water on a once-through basis for the most part. Such systems are wasteful of water and cleaning and conditioning agents, are energy inefficient, and generally require application of cleaning and conditioning agents by hand.

U.S. Pat. No. 4,730,576 discloses a small animal washing and drying apparatus which includes water recirculation. The apparatus of this patent comprises a cabinet or housing which contains a washing tub and a drain tank or overflow tank along side the wash tub. The wash tub and the drain tank are in communication only at the respective upper ends. Fresh water and recirculated water are introduced into the wash tub below the upper edge thereof and below the water line. Water is recirculated from the drain tank back to the wash tub. The wash tub has a bottom drain opening for discharge of water to sewage: there is no provision for recirculating water discharged through this drain opening. The apparatus also includes a dryer for drying an animal.

U.S. Pat. No. 4,549,502 discloses an enclosed washing and drying system for washing either small or large animals. An animal is placed inside the device with its head protruding from one end with the enclosure acting as a restraint on the animal. Jets within the enclosure are used for directing cleansing liquid against the animal while brushes mounted within the enclosure scrub the animal clean. Once the cleaning cycle has been completed, jets direct drying air against the animal to complete the process. The device also incorporates an air pump with a heating element which allows warm air to pass through the same water supply pipes, when not in use, to blow dry at the animal. The device also incorporates a drain filter for removing hair and debris from within the enclosure. This apparatus is directed toward full automatic cleaning and scrubbing of an animal rather than recirculating and filtering of wash water.

U.S. Pat. No. 4,577,624 discloses a portable water massage and whirlpool bath for massaging the legs of four-legged animals, particularly horses and larger animals. The apparatus shown therein includes a tub which resembles a bucket, for receiving a leg of an animal. The apparatus includes a pump and associated piping for recirculating water from the tub back to the tub. However, the tub must be filled with water by hand (by means not shown in the patent), and water is drained from the tub without recirculation when a hydro-massage operation is completed.

Although various devices for washing and drying an animal are know in the art, these in general do not provide for efficient use of water for cleaning and conditioning agents, and in some cases are overly complicated. Although such devices are known in the art, hand washing and grooming remains the method most widely used.

SUMMARY OF THE INVENTION

An object of this invention is to provide a bathing system for an animal which provides for more thorough cleaning and rinsing of an animal than that achieved in presently known systems.

Another object of this invention is to provide an animal bathing system which provides for more efficient use of water and cleaning and conditioning agents than as achieved in presently known systems.

A further object of this invention is to provide a recirculating water system for an animal washing and drying apparatus, so that water is used more efficiently and a smaller quantity of water is required.

A further object of this invention is to provide an animal bathing and drying system which includes an air dryer in additional to an improved animal bathing system.

A still further object of this invention is to provide an animal washing and drying system which achieves thorough washing and rinsing of an animal and is also faster and less labor intensive than either hand washing or presently known animal washing and drying systems.

These and other objects are achieved by the present invention, which will now be described.

This invention according to one aspect provides an animal bathing system, which is a recirculating water system comprising: (1) a fresh water input conduit having a first valve, (2) a drainage output conduit having a second valve therein for discharging waste water, (3) a pump having an inlet and an outlet, in which the fresh water input is connected to the pump inlet and the drainage conduit is connected to the pump outlet. The recirculating water system further comprises a water recirculation loop for recirculating water from the pump to a wash tub and back. This recirculation loop comprises a water supply conduit for supplying water from the pump to the tub. This water supply conduit terminates in a discharge end for discharging water at the discharge end into the tub and includes a nozzle and a manually operated valve for controlling flow of water through the nozzle. The discharge end and the nozzle are surrounded by air and the nozzle is preferably hand held. The recirculation loop further includes a water return conduit for returning water from a bottom drain opening in the tub back to the pump. A check valve in the water-return conduit prevents backflow.

A preferred water recirculation system also includes a second recirculation loop for preventing pump burnout. This recirculation loop comprises a water recirculation conduit connected at one end to the pump outlet and at the other end to the pump inlet for recirculation of water through the pump when flow of water through the first recirculation loop is cut off. The second recirculation loop makes it possible to put the system of this invention "on hold" in the event of an interruption while an animal is being bathed, so that the entire system does not have to be shut down until a bathing cycle is complete.

This invention according to a second aspect provides an air dryer heater in addition to the foregoing bathing or water recirculation system.

According to a preferred embodiment, a bathing and drying system of this invention is housed in a portable housing or cabinet, except for external hose connections to and from an animal bathing tub. This preferred embodiment is intended for use with an existing tub (which may be a bathtub) having a fresh water supply (such as a faucet) and further including a bottom drain opening for draining waste water from the tub into a drainage outlet or sewer line. The present apparatus can be used with such a tub by disconnecting the drain pipe and instead providing a conduit (which may be flexible hose) for directing water from the drain opening of the tub back to the portable apparatus of this invention, and connecting the drainage output conduit of this apparatus with the drainage outlet or sewer pipe.

This invention according to a further aspect provides a method for bathing an animal which comprises placing the animal in a tub which has a bottom wall with a drain opening, filling the tub with fresh water to desired water depth, draining water from the tub through the drain opening and recirculating a mixture of this water and one or more cleaning agents, spraying and washing the animal with said mixture thus recirculated, and rinsing the animal with a mixture of fresh water and recirculated water.

BRIEF DESCRIPTION OF THE DRAWINGS

In the drawing:

FIG. 1 is a simplified front elevational view showing a conventional bathtub having a fresh water supply and a drain pipe which leads to a drainage outlet or sewer line.

FIG. 3 is a perspective view of a cabinet for housing a bathing and drying system of the present invention, as seen from the front.

FIG. 4 is a perspective view of the cabinet, as seen from the rear.

FIG. 5 is a back view of the cabinet, with portions cut away and portions shown in section, illustrating the drying system in further detail.

DESCRIPTION OF THE PREFERRED EMBODIMENTS

Figure 2:
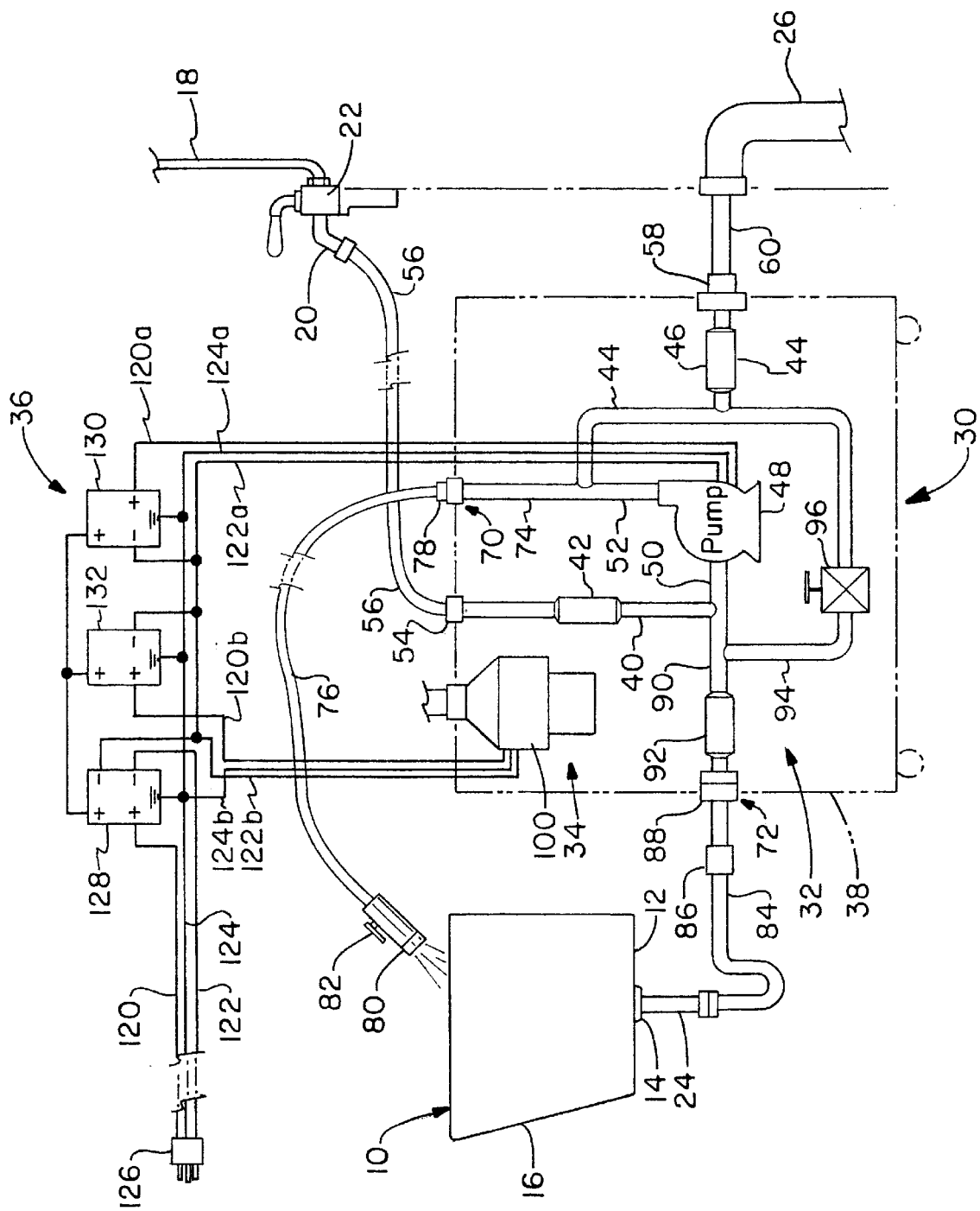
FIG. 2 is a schematic representation of a combined bathing and drying system according to a preferred embodiment of the present invention.

This invention will now be described in detail with reference to the accompanying drawings, which illustrate the invention according to the best mode and preferred thereof.

FIG. 1 illustrates a conventional bathtub and associated plumbing with which an animal bathing and drying system of the present invention can be used. Referring to FIG. 1, 10 is an open top bathtub having a bottom wall 12 with a drain opening 14 therein, and one or more upstanding sidewalls 16 which extend upwardly from the bottom wall 12. Fresh water is supplied to the bathtub by means of a water supply which includes a fresh water inlet pipe 18 having a faucet 20 with an on/off valve 22. The fresh water supply may comprise separate hot and cold water pipes which come together in a conventional mixing faucet which has separate hot water and cold water on/off valves, instead of the structures shown. Drainage from the bathtub is effected by means of a drain pipe 24 which receives water discharged through the drain opening 14, and a sewer pipe 26 to which the drain pipe 24 is connected. Drain pipe 24 may have a P-trap as shown.

FIGS. 2–5 illustrate a preferred bathing and drying system according to the present invention.

Referring now to FIG. 2, a preferred bathing and drying system 30 according to the present invention comprises a recirculating water bathing system 32, a drying system 34, and an electrical system 36 for operating the bathing system 32 and the drying system 34. A preferred bathing and drying system 30 of this invention also comprises a rectangular housing or cabinet 38, in which all components of the recirculating water bathing system 32, the drying system 34, and the electrical system 36, with certain exceptions which will be described hereinafter are housed. Drying system 34 is optional and may be omitted. When the drying system 34 is omitted, a system according to this invention may be referred to simply as an animal bathing system.

The preferred cabinet 38 is mounted on four wheels 39, one at each corner of the cabinet. Wheels 39 are shown in FIGS. 4–7. Casters may be used instead of wheels if desired. The purpose of mounting the cabinet and components housed therein on wheels or casters is to make a system 30 of the present invention portable.

The bathing system 32 may be placed on a floor near a tub 10, with fresh water supply 18 at a higher level than bathing system 32.

Referring now to FIG. 2, a bathing system 32 of the present invention comprises a fresh water input conduit 40 having a first valve (or fresh water supply valve) 42 therein, a drainage output conduit 44 having a second valve (or drain discharge valve) 46 therein, and a pump 48 having a pump inlet 50 and pump outlet 52.

Pump 48 may be of any suitable type and power rating for pumping water in an animal bathing system. A preferred pump is an in-line pump which permits water flow through the pump whether or not the pump is in operation. A one-half horse power motor has been found to be satisfactory for driving the pump.

Fresh water input conduit 40 extends vertically downward from the top wall of housing 38 to the inlet 50 of pump 48. An external connection or nipple 54 is provided on the outside of the top wall of housing 38 for receiving a flexible hose 56 which may be connected to an existing fresh water inlet source such as faucet 20. This permits delivery of fresh water from an outside source to the fresh water inlet pipe 40.

Drainage output pipe 44 extends from pump outlet 52 to a sidewall of housing 38. The final leg of drainage output 44, which includes the second valve 46, is horizontal and terminates in a connection 58 on the outside of the sidewall of housing 38. This external connection or nipple 58 is adapted to receive a flexible hose 60 or other conduit which may be connected by means of a pipe joint to the drainage conduit 26.

Valves 42 and 46 are manually operated on/off valves. Each of these valves has a fully opened position, a fully closed position, and preferably at least one intermediate or partially opened position. More preferably, each of these valves has a continuous range of partially open positions ranging from just short of fully opened to nearly fully closed. Each of these valves may be of any convenient manually operated type, e.g., a rotary plug valve. The first valve 42 may be manually operated by means of a hand lever 62 which extends to the exterior of cabinet 38 on the front wall thereof. Similarly, the second valve 46 may be manually operated by means of a hand operated lever 64 which extends to the exterior of cabinet 38 along a sidewall (e.g., the right sidewall) thereof.

The bathing system 32 of this invention further comprises a first recirculation loop for conveying wash water from pump 48 to tub 10 and back. The first recirculation loop in turn comprises a wash water supply conduit 70 and a recirculating water return conduit 72. Wash water supply conduit 70 comprises a recirculating water outlet pipe 74 inside housing 38, connected to a flexible hose 76 outside the housing 38. The recirculating water outlet pipe 74 is preferably a rigid pipe (for example, PVC) which extends from the pump outlet 52 to the front wall of housing 38. A nipple 78 is provided on the exterior front wall of housing 38 for a connection of flexible hose 76 to the recirculating water outlet pipe 74. The flexible hose is connected at its inlet end to nipple 78 and has at its discharge end a hand held nozzle 80 which includes a manually operated on/off valve 82. In operation, the hand held nozzle is held by a user so that it is above tub 10 and therefore surrounded by air, so that an aqueous stream discharged from the nozzle 80 can be directed through air against an animal being bathed in tub 10 and thence into tub 10.

Return conduit 72 includes a flexible hose 84 which extends from drain opening 14 of tub 10 to an in line filter 86. The in line filter is an easily removable, washable filter which removes hair and dirt particles from water in return conduit 72 when the system is in the recirculating mode. This prevents or deters foreign material from entering the pumping system and damaging the pump 48. The in line filter in turn is connected to a connection or nipple 88 which is provided on an outside wall of housing 38, and is shown in FIG. 4 on the right hand sidewall of housing 38.

It is desirable to provide a removable strainer (not shown) in drain opening 14, in addition to the in-line filter 86. This will lessen the load on in-line filter 86 and result in smoother operation.

The return conduit 72 further comprises a rigid pipe section 90 inside the housing 38, which extends from the housing wall 38 to the inlet 50 of pump 48. Return pipe section 90 has a check valve 92 for preventing backflow of water from the inlet side of pump 48, e.g., from fresh water input pipe 40, back to the tub 10. Check valve 92 permits water flow only in one direction, i.e., from tub 10 to pump 48.

Finally, a recirculating water system 32 (or bathing system) includes a second recirculation loop for circulating water from the outlet 52 of pump 48 back to the inlet 50 of pump 48. This second recirculation loop comprises a rigid pipe 94 connected to the water output or discharge conduit 44 at one end and to the inlet 50 of pump 48 at the other end. A portion of the drainage output conduit 44, from pump outlet 52 to the connection with pipe 94, completes the second recirculation loop. Pressure relief valve 96 is normally closed and automatically open when a predetermined pressure is reached. Normally, pressure relief valve 96 will be closed, and will open only when the second or drainage output valve 46 and the nozzle valve 82 are both closed. The second recirculation loop prevents accidental burnout of pump 48 under such conditions.

The drying system 34 of this invention includes an air dryer 100 which includes a heater. This dryer may be mounted on a suitable mounting structure, e.g., a horizontal interior partition 102 (shown in FIG. 7) having an opening therein. The dryer may be located at any desired portion inside housing 38, e.g., in an upper portion of the cabinet toward the back. Air dryer 100 has an air cooled motor (which is not separately shown). An air intake opening 104 in the back wall of cabinet 38 provides for admission of air to the dryer 100 for cooling the motor. A removable air filter for intake opening 104 is provided in order to minimize or prevent the entry of dust and other fine particulate matter into the air dryer.

Hot air from the dryer exits the cabinet 38 through a hot air outlet opening in the top of the cabinet. This hot air outlet air opening is surrounded by a connection or nipple 108 to which an air hose 110 (shown in phantom lines) may be connected. A grooming arm 112 may be provided as an aid in supporting the air hose. The air hose 110 is provided for drying an animal after bathing is complete.

Electrical system 36 (shown in FIG. 2) provides means for supplying power to pump 48 and to dryer 100 (when present). Parallel circuits, each having its own on/off switch, are provided for this purpose.

Electrical system 36 comprises a hot wire 120, a return wire 122, and a ground wire 124. A three-pronged plug 126, to which each of these wires is connected, is located outside cabinet 38 and provides for connection to an external power source and ground (not shown).

The external power source can be either alternating current (A/C) or direct current (D/C); alternating current will ordinarily be used because of its much greater availability.

A ground fault interrupter (GFI) 128, which is also known as a ground fault circuit interrupter (or GFCI), is provided for safety reasons. Hot wire 120 has two branches 120*a* and 120*b* for supplying power to pump 48 and to heater/dryer 100, respectively. Similarly, return wire 122 has connections 122*a* and 122*b* for pump 48 and heater/dryer 100, respectively, and ground wire 124 likewise has connections 124*a* and 124*b*, respectively, for pump 48 and heater/dryer 100, respectively. Last, parallel circuits are provided for supplying 20 power to the pump 48 and the heater/dryer 100. A first switch 130 controls the supply of power to pump 48. Similarly, a second switch 132 controls the supply of power to dryer 100.

In animal bathing systems according to this invention which do not include a dryer, the hot wire, return wire and ground wire connections 120*b*, 122*b* and 124*b*, respectively, and the second switch 132, are omitted.

All piping inside housing 38 is rigid and may be either plastic or metal as desired. Plastic piping, especially polyvinyl chloride (PVC), is fully satisfactory and is preferred for reasons of costs.

Housing or cabinet 38 may be of any desired size. A preferred size for an animal bathing and drying system is 25 inches high×25 inches wide×15 inches deep. A preferred cabinet size for an animal bathing system which does not include a dryer is 16½ inches high×16½ inches wide×15 inches deep. These dimensions are merely illustrative, and an actual cabinet size may be either larger or smaller if desired.

Bathing or recirculating water system 32 of this invention can be designed for any desired pumping system capacity and water pressure at the nozzle 80. A preferred pumping system can recirculate up to 2,280 gallons per hour (G.P.H.). Such preferred pumping system may include an in-line pump 48 driven by a one-half horse power motor as previously indicated. Water pressure at the nozzle 80 may range up to 25 pounds per square inch gauge (P.S.I.G.). At these recirculation rates and water pressures, hand massaging for the purpose of cleaning, working the product (water and cleaning agents) into the animal's coat and skin and for releasing of loose coat is eliminated. The result is a cleaner, more efficient bath, in considerably less time, and with much less physical effort for the user.

Operation of this system according to this invention will now be described.

First, a portable system 30 according to this invention is connected to a fresh water supply and a sewage drain as shown in FIG. 2. As noted previously, this requires disconnection of a drain pipe 24 of a conventional installation, connection of a fresh water supply 18 to a fresh water input conduit 40 of the present apparatus, connection of a drain opening 14 of a tub 10 to a return conduit 90, and a connection of a drainage output conduit 44 of the present apparatus to a sewage drain or sewer pipe 26.

After completing the hook up as described in the preceding paragraph, the user is ready to start using the unit for the first time. The following initial start up procedure is recommended: Turn on cold water only at the fresh water supply source 18. Open the fresh water supply valve 42 and the nozzle valve 82. After a few seconds water will begin to come out of the bathing hose nozzle 82. Then turn on the bathing system pump 48. Now the hot water supply is turned on. (When the fresh water supply includes a conventional mixing faucet, this is accomplished simply by opening the hot water valve of the mixing faucet. If the fresh water supply comprises a single pipe line having a heater therein, the heater can be turned on at this point.) The user now adjusts the hot and cold water supplies to desired temperature while leaving the pump 48 running and the fresh water supply valve 42 and the nozzle valve 82 open. Once the desired bathing temperature has been achieved, further control of fresh water is best accomplished by means of the fresh water supply valve (or first valve) 42. To put the bathing unit into recirculating mode, one closes both the fresh water supply valve 42 and the drain discharge valve 46 while leaving the nozzle valve 82 open. Water flow is now controlled by the nozzle valve 82. Any excess water in tub 10 can be discharged simply by opening the drain discharge valve (or second valve) 46.

To become familiar with the fresh water rinse cycle, a user may turn the fresh water supply valve 42 and the drain discharge valve 46 to half open positions. (Handles 62 and 64 on the exterior of cabinet 34 are provided for this purpose.) To empty the tub 10, one turns off the fresh water supply valve 42 and turns the handle for drain discharge valve 46 to open position. As soon as the tub is drained, the pump 48 is turned off immediately.

The above start up procedure is recommended when a unit is first put into operation and at any time thereafter when the unit becomes dry (as for example when the unit is moved from one location to another).

A complete bathing cycle, which includes washing and rinsing, will now be described.

A complete bathing cycle according to this invention includes the steps of: (1) filling, (2) washing, (3) rinsing, (4) draining.

Table I is a truth table showing the positions of input valve 42, output valve 46 and nozzle valve 82 during each of the above steps in an operating cycle.

TABLE I

| Step | Input valve 42 | Output valve 46 | Nozzle valve 82 |
|---|---|---|---|
| Filling | Open | Closed | Open |
| Washing | Closed | Closed | Open |
| Rinsing | Open or partially open | Open or partially open | Open |
| Draining | Closed | Open | Closed |

Pump 48 is in operation and pressure relief valve 96 is closed during each of the above steps which comprise the complete operating cycle. As will be explained later, pressure relief valve 96 opens only when operation of the system is interrupted or put on "on hold" during the course of a complete operating cycle.

Filling is accomplished by drawing in water from a fresh water source 18 through fresh water input conduit 40, and pumping this water to tub 10 by fresh water supply conduit 70 until the tub 10 is filled to a desired depth of water. The drainage output valve 46 is closed. Some water in tub 10 (about 2 inches) is essential in order to assure proper water recirculation. Desired treating agents, e.g., a cleaning agent or detergent and a conditioner, may be charged to tub 10 either while the tub is still dry or during the filling cycle, or after recirculation of water (to be described in the next step) has begun. Fresh water admitted to the system is at desired bathing temperature. This can be accomplished either through use of a conventional mixing faucet in the fresh water supply line (the easiest and preferred method), or by heating the fresh water before it enters the apparatus 30 of this invention.

The washing step or cycle, which is the next step in the complete operating cycle, is carried out using recirculated aqueous medium, i.e., water and treating agents, only. To this end both the input valve 42 and the output valve 46 are closed, the nozzle valve 80 is open and pump 48 is in operation. An animal to be bathed is placed in the tub at some desired point in the operating cycle, anywhere from before filling of tub 10 begins to just after recirculation is started. Recirculated water is withdrawn from tub 10 through drain opening 14 and is conveyed through recirculating water conduit 72 to the inlet of pump 48. A recirculating water stream is then pumped by pump 48 through the wash water supply conduit 70. Recirculated wash water is sprayed through nozzle 80 (which is at the discharge end of wash water conduit 70) at the animal being bathed. This water is actually a mixture of water and one or more treating agents, e.g., detergent and conditioner or combination thereof as desired. The nozzle 80 is hand held by a user so that water is directed through air against the animal being bathed and so that all water exiting through the nozzle is caught by tub 10. This assures a closed loop recirculation with no significant water loss.

Once the animal is clean, the washing step is discontinued and the rinsing step or cycle commences. Water input valve 42 and drainage output valve 46 are opened either fully or partially. Pump 48 continues in operation. Rinse water is circulated from the water input conduit 40 through pump 48 and recirculated water supply conduit 70 to tub 10, and then back through return conduit 72. Thus, the animal is rinsed with a mixture of fresh and recirculated water. The openings of fresh water input valve 42 and drainage output valve 46 are such that the fresh water input rate and the drainage or waste water output rate are essentially the same, with the result that the water level in tub 10 will remain essentially constant (and sufficient for proper water recirculation). The rinsing step is continued until the animal has been thoroughly rinsed of soil and cleaning agents.

After rinsing is complete, the system 30 is drained. To this end, the fresh water input valve 42 and the nozzle valve 82 are closed, the drainage output valve 46 is fully opened, and pump 48 is continued in operation until essentially all water has been pumped out of tub 10 and out of the system 30.

The animal may be dried, using the drying system 34, either during the drainage cycle or immediately thereafter. The animal may remain in tub 10 for drying.

Sometimes it is necessary to interrupt an overall operating cycle while bathing is in progress. The recirculating water system 32 of this invention permits this. For example, a user of the system receives an unexpected visit or phone call, the user closes the fresh water input valve 42, the drainage output valve 46 and the nozzle valve 82. Pump 48 continues in operation. During this interruption, the system is "on hold" and water continuously recirculates through the second recirculation loop, i.e., from pump outlet 52 via drainage output 44 and recirculation conduit 94 back to pump inlet 50. When valves 42, 46 and 82 are closed, pressure quickly builds up on the outlet side 52 of pump 48 to the pressure at which pressure relief valve 96 opens, thus permitting recirculation of water in the manner described. This is a safety feature, provided so that pump 48 will not burn out or be damaged when valves 42, 46 and 82 are closed.

The bathing and drying system 30 of this invention affords significant advantages over either hand washing of an animal or use of an apparatus or system known in the prior art.

The apparatus of the present invention provides significant advantages over either hand washing of an animal or use of an apparatus such as is known in the prior art.

First, hand applying of cleaning and conditioning agents is virtually eliminated because these products are dispensed directly into the bathing system.

Second, hand massaging for the purpose of cleaning, working of product (cleaning and conditioning agent) into an animal's coat and skin and releasing of loose coat is eliminated, when sufficiently high flow rate and water pressure at the nozzle are used. The design flow rate and pressure indicated earlier in this specification are sufficient for this purpose. The result is a cleaner, more efficient bath, accomplished in considerably less time, and with much less exhaustive physical effort for the user.

Third, the system of this invention provides a thorough and efficient rinse cycle, giving more thorough and efficient rinsing of an animal with less physical effort by the user in hand washing or with most systems presently known in the art.

Fourth, conservation of both water and cleaning (and conditioning) agents is achieved, as compared to either hand washing or presently known apparatus. The unique recirculation system of this invention makes this possible. It will be noted that water which is drained through the drain opening 14 of bath tub 10 herein is completely recirculated and any other solid foreign matter are removed. This makes for much more efficient use of water than can be accomplished either in hand washing, or in systems in which water is used on a once-through basis, or in systems in which only overflow water from the bathtub is recirculated and all water drained from the bottom of the bathtub is discarded.

Fifth, the present system provides for convenient drying of an animal. While some prior art bathing systems also provide for drying, hand washing does not, except by use of a separate hand held dryer (e.g., a hair dryer intended for human use), which is much less convenient.

Sixth, a preferred apparatus or unit of this invention is mounted on wheels (preferably rubber wheels) for easy mobility. This unit is self-contained, is independent of a permanently installed bathtub, and does not require a bathtub of its own. This apparatus can readily be moved from one bathtub to another with a simple disconnect and hook up procedure.

Other advantages will be apparent from the preceding specification.

The apparatus of this invention can be made in any convenient size. The apparatus can be of small size and yet capable of delivering high volumetric flow rates, which are dependent primarily on the capacity of the pump which is used.

The apparatus of this invention can be used for washing animals of any desired size, and is particularly useful for washing small animals, in particular dogs.

While this apparatus has been described with particular reference to the best mode and preferred embodiment thereof, it shall be understood that this description is by way of illustration and not limitation.

What is claimed is:

1. An animal bathing system comprising:
   (a) a fresh water input conduit having a first valve therein;
   (b) a drainage output conduit for discharging waste water, said drainage output conduit having a second valve therein;
   (c) a pump having an inlet and an outlet, said fresh water input conduit being connected to the pump inlet and said drainage output conduit being connected to the pump outlet;
   (d) a water supply conduit for supplying water from said pump to a tub for bathing an animal, said water supply conduit terminating in a discharge end which is surrounded by air, said water supply conduit including a nozzle at said discharge end and a manually operable valve for controlling flow of water through said nozzle, said nozzle being adapted to direct a water stream against an animal which is being bathed in said tub; and
   (e) a water return conduit for returning used water from said tub to said pump, said water return conduit being connected at one end to a drain opening in said tub and at the other end to said pump inlet, said return conduit receiving the entire water output from the said tub and including a check valve for preventing backflow;
   wherein said fresh water input conduit is adapted to receive fresh water from an external fresh water supply, and said drainage output conduit is adapted to be connected to a sewer main.

2. An animal bathing system according to claim 1, wherein said first and second valves each has an open position and a closed position and is manually operable.

3. An animal bathing system according to claim 2, wherein said first and second valves each has at least one partially open position.

4. An animal bathing system according to claim 1, wherein said tub has a bottom drain opening.

5. An animal bathing system according to claim 1, wherein said water return conduit includes an inline filter for removing animal hair and other solids.

6. An animal bathing system according to claim 1, further including a water recirculation conduit connected at one end to said pump outlet and at the other end to said pump inlet for recirculation of water through said pump when water flow through said water recirculation conduit including a normally closed pressure release valve which opens at a predetermined pressure.

7. An animal bathing system according to claim 1 wherein said nozzle is hand held and said manually openable valve is associated with said nozzle.

8. An animal bathing and drying system according to claim 1, said system further including a dryer.

9. An animal bathing and drying system according to claim 8, further including an electrical system for operating said pump and said dryer.

10. An animal bathing and drying system according to claim 9, wherein said electrical system comprises means for supplying power to said pump and said dryer, a first on/off switch controlling supply of power to said pump, a second on/off switch for controlling supply of power to said dryer, and means for grounding said pump and said dryer.

11. An animal bathing and drying system according to claim 10, wherein:
(1) said electrical system includes a three-prong plug for connection to a grounded external power supply, and a ground fault interrupter;
(2) said means for supplying power includes a hot wire and a return wire, each of which is connected to said plug and said ground fault interrupter;
(3) said means for grounding includes a ground wire interconnecting said plug, said ground fault interrupter, said pump and said dryer.

12. An animal bathing system comprising:
(a) housing having an inlet opening for fresh water and an outlet opening for discharge of waste water;
(b) a fresh water input conduit having a first valve therein;
(c) a drainage output conduit for discharging waste water, said drainage output conduit having a second valve therein;
(d) a pump having an inlet and an outlet, said fresh water input conduit being connected to the pump inlet and said drainage output conduit being connected to the pump outlet;
(e) a water supply conduit for supplying water from said pump to a tub for bathing an animal, said water supply conduit terminating in a discharge end which is surrounded by air, said water supply conduit including a nozzle at said discharge end and a manually operable valve for controlling flow of water through said nozzle, said nozzle being adapted to direct a water stream against an animal which is being bathed in said tub; and
(f) a water return conduit for returning used water from said tub to said pump, said water return conduit being connected at one end to a drain opening in said tub and at the other end to said pump inlet, said return conduit receiving the entire water output from the said tub and including a check valve for preventing backflow;
wherein said fresh water input conduit, said first valve, said drainage output conduit, said second valve and said pump are housed in said housing, and
wherein, further said fresh water input conduit is adapted to receive fresh water from an external fresh water supply, and said drainage output conduit is adapted to be connected to a sewer main.

13. An animal bathing and drying system according to claim 12, said system further including a dryer housed within said housing.

14. A method for bathing an animal which comprises:
(a) placing an animal in a tub comprising a bottom wall having a drain opening therein;
(b) filling said tub to a desired depth with fresh water;
(c) washing said animal in said tub while recirculating a mixture comprising water and one or more cleaning agents, said recirculating comprising draining a mixture comprising water and said one or more cleaning agents from said tub through said drain opening, pumping said mixture through a water supply conduit having a nozzle at a discharge end therein, and spraying said animal with said mixture thus recirculated; and
(d) rinsing said animal with a mixture of fresh water and recirculated water.

15. A method according to claim 14 wherein said one or more cleaning agents are added to said bathtub and are mixed with water therein.

16. A method according to claim 14 wherein no fresh water is supplied while washing said animal and waste water is discarded while rinsing said animal.

17. A method according to claim 14 wherein supply of fresh water is discontinued when said desired water level is reached.

18. A method according to claim 14 wherein said water is supplied to said bathtub through a nozzle which is hand held in a position above said tub.

19. A method according to claim 18 wherein said nozzle has a manually operable on/off valve associated therewith.

20. A method according to claim 14, further comprising draining water from said tub through said water return conduit when said rinsing is complete.

21. A method according to claim 14, further including drying said animal when said rinsing is complete.

22. A method according to claim 14, said method further comprising:
(a) providing an animal bathing system comprising (1) a fresh water input conduit having a first valve therein, (2) a drainage output conduit having a second valve therein for discharging waste water, (3) a pump having an inlet and an outlet, wherein the water input conduit is connected to the pump inlet and the drainage output conduit is connected to the pump outlet, (4) a water supply conduit for supplying water from said pump outlet to said bathtub, (5) a water return conduit for returning water from said drain opening to said pump inlet;
(b) opening said first valve and closing said second valve for supplying fresh water to said bathtub until said desired water level is reached;
(c) closing said first and second valves for recirculating water and washing said animal; and
(d) at least partially opening said first and second valves for rinsing said animal.

23. A method according to claim 22, further including closing said first valve, discontinuing the supply of water to said bathtub, and opening said second valve and discharging water to a waste water main, when said rinsing is complete.

24. A method according to claim 23, further including the step of drying said animal.

25. An animal bathing system comprising:
(a) a fresh water input conduit having a first manually operable valve therein;
(b) a drainage output conduit for discharging waste water, said drainage output conduit having a second manually operable valve therein;
(c) a pump having an inlet and an outlet, said drainage output conduit being connected to the pump outlet;
(d) a water supply conduit for supplying water from said pump to a tub for bathing an animal, said water supply conduit terminating in a discharge end which is surrounded by air, said water supply conduit including a nozzle at said discharge end and a third manually operable valve associated with said nozzle for controlling flow of water through said nozzle, said nozzle being adapted to direct a water stream against an animal which is being bathed in said tub; and
(e) a water return conduit for returning used water from said tub to said pump, said water return conduit having a first end for receiving water from said tub and a second end connected to said pump inlet, said return conduit receiving the entire water output from the said tub and including a check valve for preventing backflow; wherein:

said fresh water input conduit is adapted to receive fresh water from an external fresh water supply, and said drainage output conduit is adapted to be connected to a sewer main; and said water supply conduit is adapted to receive fresh water from said fresh water input conduit, recirculated water from said water return conduit, or a mixture of fresh water and recirculated water.

26. An animal bathing system according to claim 25, wherein said water return conduit is connected at one end to a drain opening in said tub.

27. An animal bathing system according to claim 25, wherein said nozzle is hand held.

28. An animal bathing and drying system according to claim 25, further including a dryer.

29. An animal bathing system comprising:

(a) a housing having an inlet opening for fresh water and an outlet opening for discharge of waste water;

(b) a fresh water input conduit having a first manually operable valve therein;

(c) a drainage output conduit for discharging waste water, said drainage output conduit having a second manually operable valve therein;

(d) a pump having an inlet and an outlet, said drainage output conduit being connected to the pump outlet;

(e) a water supply conduit for supplying water from said pump to a tub for bathing an animal, said water supply conduit terminating in a discharge end which is surrounded by air, said water supply conduit including a nozzle at said discharge end and a third manually operable valve associated with said nozzle for controlling flow of water through said nozzle, said nozzle being adapted to direct a water stream against an animal which is being bathed in said tub; and (f) a water return conduit for returning used water from said tub to said pump, said water return conduit having a first end for receiving water from said tub and a second end connected to said pump inlet, said return conduit receiving the entire water output from the said tub and including a check valve for preventing backflow;

wherein said fresh water input conduit, said first valve, said drainage output conduit, said second valve and said pump are housed in said housing, and wherein, further said fresh water input conduit is adapted to receive fresh water from an external fresh water supply, and said drainage output conduit is adapted to be connected to a sewer main.

30. An animal bathing and drying system according to claim 29, said system further including a dryer housed within said housing.

* * * * *